Dec. 6, 1927.                                                          1,652,122
H. L. HORNING
MEANS FOR PREVENTING DETONATION AND DECREASING
VARIATIONS IN SPARK TIMING
Filed Nov. 24, 1924          2 Sheets-Sheet 1
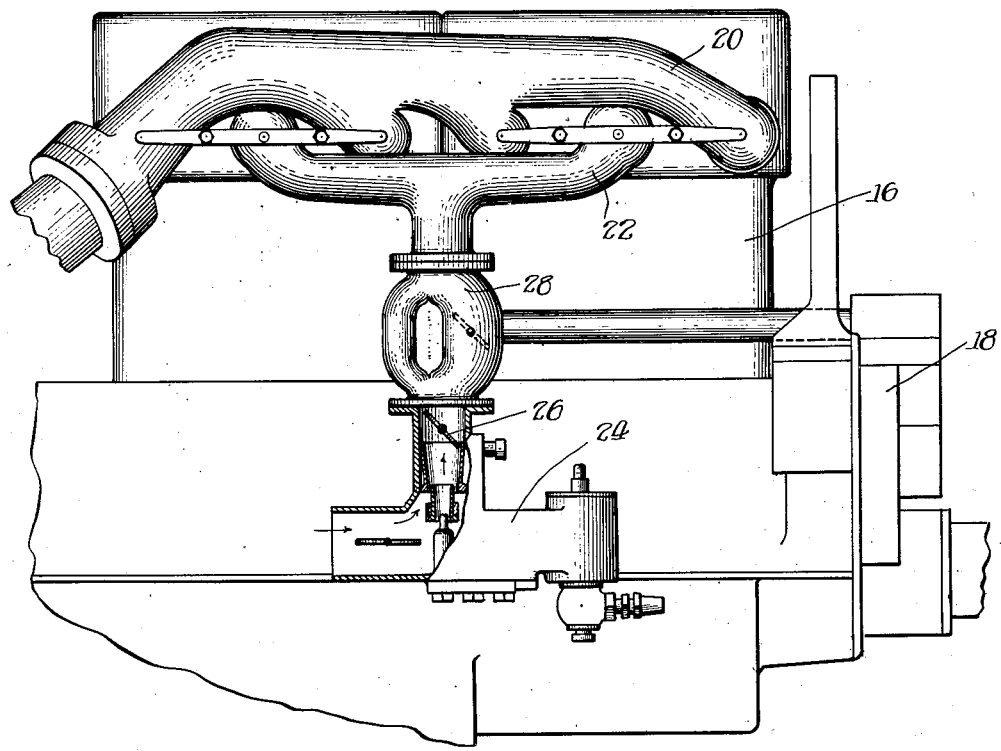
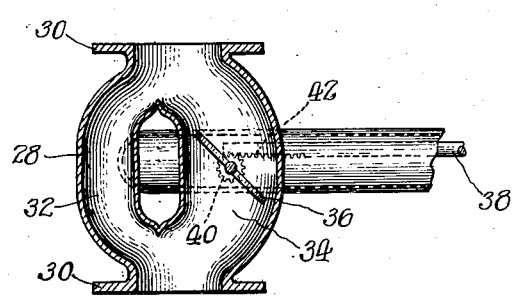
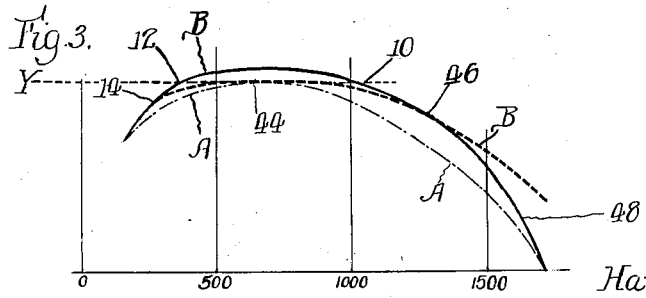
Witness:
A. J. Sauser.
Inventor:
Harry L. Horning
By Brown, Boettcher & Dienner
Attys.

Dec. 6, 1927. 1,652,122
H. L. HORNING
MEANS FOR PREVENTING DETONATION AND DECREASING
VARIATIONS IN SPARK TIMING
Filed Nov. 24, 1924 2 Sheets-Sheet 2

Inventor:
Harry L. Horning,
By Brown, Boettcher & Dienner
Attys.

Witness:
A. J. Sauser.

Patented Dec. 6, 1927.

1,652,122

UNITED STATES PATENT OFFICE.

HARRY L. HORNING, OF WAUKESHA, WISCONSIN.

MEANS FOR PREVENTING DETONATION AND DECREASING VARIATIONS IN SPARK TIMING.

Application filed November 24, 1924. Serial No. 751,935.

My invention relates to internal combustion engines and the operation thereof, and is chiefly concerned with improving the operating characteristics, to make it possible to carry a higher compression ratio at most speeds, by changing the nature or quantity of the charge at those speeds at which detonation occurs in an engine of high volumetric capacity. According to one method of doing this, I throttle the explosive mixture at the speeds in question. Alternatively, I dilute the charge with inert gases at these same speeds. In either case, this is done in such a manner as to obtain a torque curve just below that at which detonation occurs throughout the speed range involved, thus permitting the use of larger valves, manifold and carburetor than would otherwise be practicable, with a correspondingly higher torque at the higher speeds.

A further object of the invention is to take advantage of the effect of this systematic change at certain speeds, and the favorable operation of Ricardo combustion chambers to simplify the operation of spark timing by the combination of the mutually helpful effects of these two inventions to that end.

Further objects and advantages of the invention will become apparent as the description proceeds.

In the accompanying drawings:—

Fig. 1 is a side elevation of an internal combustion engine indicating the application of one form of my invention thereto;

Fig. 2 is a detail section through part of the intake passages;

Fig. 3 is a hypothetical diagram;

Figure 4:
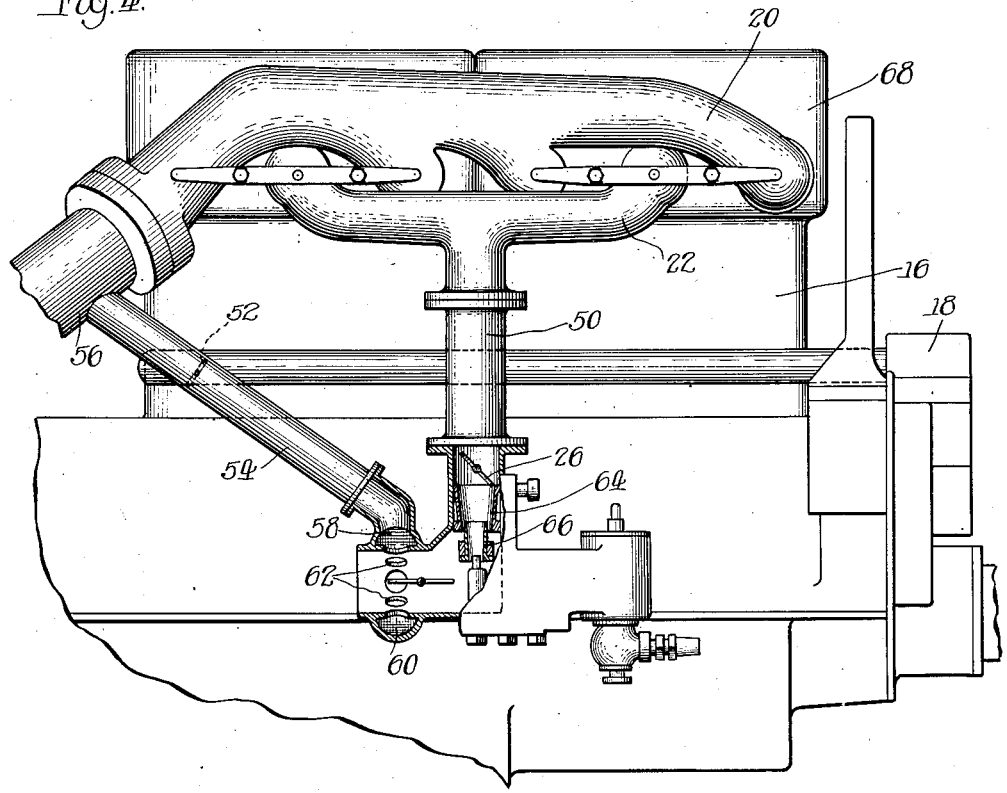
Fig. 4 is a side elevation of an engine similar to Fig. 1 indicating the application of another form of the invention thereto.

The causes of detonation are legion, but with a given design of engine and a given fuel there is a fairly definite limit to the charge per stroke that can be handled without detonation. Referring to Fig. 3, assume an engine in which detonation will occur whenever the torque exceeds that indicated by the dotted line Y—10. While this line happens to be straight and horizontal in the diagram, it should be borne in mind that only a purely hypothetical case is presented for a clear understanding of the invention, and it will be quite obvious not only that this line may be and probably does vary in height with speed, but that such slopes as the different parts thereof may have, cannot affect the principle of the invention, but represent merely the individual peculiarities which, in any event, need to be determined for each individual type of engine in developing the same. An engine having the characteristic detonation limit represented by Y—10 should be fitted with a carburetor and intake manifold of such capacity that the charge taken in per stroke will never be more than that corresponding to the curve. Thus fitted, the engine will give such a torque curve as the lower one A. It would be possible to fit the engine with a larger intake equipment to give a higher torque curve such as B, but between speeds corresponding to points 10 and 12 detonation would occur. According to my invention, I operate the engine on either torque curve and change from one to the other at different speeds to avoid the objections of both. Thus up to speed 14 I operate on the upper curve; thereafter I gradually cross over to the other curve to avoid detonation; as soon as curve B crosses line Y—10 I cross back again to the upper curve to obtain more power up to the maximum speed the engine can develop.

In the embodiment of apparatus for operation according to the invention illustrated in Figures 1 and 2, the engine 16 is equipped with a speed sensitive control device or governor 18 of any suitable or preferred construction and design, such, for instance, as those disclosed in U. S. Patent 1,104,119, Harry L. Horning, July 21, 1914, or U. S. Patent 1,304,672, to J. B. Fisher, May 27, 1919, to which patents reference is made for disclosure of a suitable type of controlling mechanism.

The engine is provided with the usual exhaust manifold 20 and inlet manifold 22. A mixture of air and liquid fuel is generated in a carburetor 24 for delivery to the engine, under the control of the manually operated throttle 26.

Between throttle 26 and the engine I provide means for varying the flow capacity of the passages between two definite predetermined limits. I have illustrated this means as embodied in an intermediate connector 28, having flanges 30 for connecting it into the assembly. The connector is enlarged intermediate its ends, to define a small passage 32, and a large passage 34. Small passage 32, if it were the only communication for supplying fuel to the engine would give operation according to the lower speed torque curve A. Passages 32 and 34, if they were both left open to operate in parallel would give operation according to the upper speed torque curve B of Fig. 3. In passageway 34 I mount an auxiliary throttle 36 controlled by longitudinal movement of rod 38 coming from governor 18. A suitable connection between throttle and governor rod is by means of pinion 40 and rack teeth 42 on the rod, or by any other means.

The parts are illustrated in Figs. 1 and 2 in the positions they occupy when the engine is standing still or idling. Under these conditions the rate of flow to the inlet passages is very small in any event, and the relatively small opening of throttle 36, in view of such low velocities, is adequate to provide for operation substantially along curve B. At speed 14 rod 38 begins to move, and gradually closes throttle 36 so that at speed 44, the throttle is completely closed and operation is on curve A, entirely controlled by passage 32. Continued increase in speed results in further rotation of throttle 36 to open passageway 34 completely at speed 46. This being the limit of movement for rod 38, operation at all higher speeds is along curve B.

Figure 5:
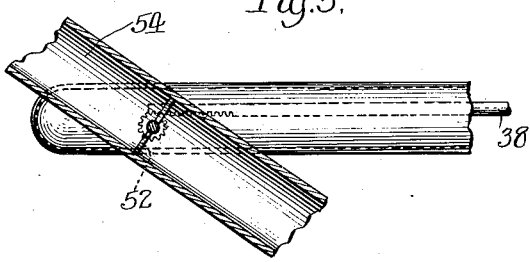
Fig. 5 is a detail section through part of the exhaust pipe interconnection of Fig. 4.

Referring now to Figures 4 and 5, I have illustrated operation according to a different method, i. e., dilution of the incoming mixture with burned or inert gases to secure operation still according to Fig. 3. Connection 28 has been replaced by a straight connection 50, and control rod 38 extends past this connection to operate a throttle 52 in a bypass 54 communicating with the exhaust passage at 56, and at 58 with an annular chamber 60 encircling the intake to the carburetor and communicating therewith through a plurality of peripheral orifices 62.

In this embodiment, the auxiliary throttle 52 must be closed at starting so that no dilution occurs, wide open at speed 44, and closed again at speed 46.

Figure 6:
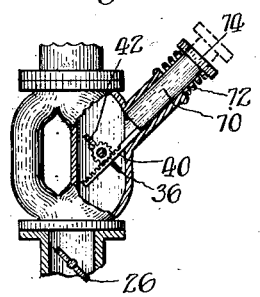
Fig. 6 is a view of a modification.

In Fig. 6 throttle 36 of Fig. 2 is shown controlled by a plunger 70 carrying rack 40 and resiliently urged outward against the suction in the passages by spring 72, pressing against head 74. This makes the constriction a function of the inlet manifold suction which is, in turn, a combine function of speed and load.

The carburetor illustrated employs a large venturi 64 and a smaller venturi 66, the fuel being delivered and mixed first in the smaller venturi 66. It will be apparent that the gases entering the carburetor intake when dilution is occurring through conduit 54 will comprise a central core of fresh air, enveloped in a sheet of burned or inert exhaust gases. In passing through the carburetor illustrated, it will be noted that the fresh gases will pass through venturi 66, and most of the exhaust gases will pass outside the same and through venturi 64. Thus fuel is mixed in the first instance, chiefly with the fresh rather than with the inert gases taken in.

Engine 16 is preferably provided with a cylinder head 68 according to U. S. Patent 1,474,003 to H. R. Ricardo Nov. 13, 1923, to which patent reference is made for detailed disclosure. It has been found that the increased speed of combustion in heads of this type may in a proper design slubstantially eliminate the necessity for variations in spark timing throughout nearly the entire speed range of the engine, with the single exception of the peak of the torque curve at speed 44. By flattening the curve at this point, as hereinabove pointed out, there is added the final step necessary to make it practicable to operate engines of this type with a fixed spark timing over the entire range of speeds and loads to which they are subjected, without large losses in power and thermal efficiency.

Without further elaboration, the foregoing will so fully explain the gist of my invention, that others may, by applying current knowledge, readily adapt the same for use under various conditions of service. It will, for instance, be obvious that the control throttles might be actuated by pressure sensitive means subjected to the pressure in the exhaust manifold or the suction in the inlet manifold, and that by continuing the movement of the governor above speed 46, a final shift back to the lower curve A could be made to prevent the operator from running the engine at higher speed than it can safely attain, as indicated at 48. These and many other modifications and alterations may readily be made by those skilled in the art without eliminating certain features which may properly be said to constitute the essential items of novelty involved, which items are intended to be defined and secured to me by the following claims.

I claim:—

1. In an internal combustion power plant, in combination, an engine, a plurality of inlet passageways, a manually controllable throttle controlling the flow to said inlet passageways, an auxiliary throttle for reducing the active charge carrying capacity of said inlet passageways, a speed sensitive governor, and connection between said governor and said auxiliary throttle for rendering said auxiliary throttle ineffective at the highest proper operating speed.

2. In an internal combustion power plant, a plurality of inlet passages, a throttle for reducing the active charge carrying capacity of said inlet passages, a speed sensitive governor, and connections between said governor and said throttle for rendering said throttle ineffective at starting and idling, fully effective at the peak of torque, and ineffective at the highest proper running speed.

3. In an internal combustion power plant, the combination of an engine, a plurality of inlet passages, a throttle for reducing the active charge carrying capacity of the inlet passages, a speed sensitive governor, and connections between the governor and said throttle for rendering said throttle ineffective at starting and idling, and fully effective at the peak of torque.

4. In an internal combustion power plant, the combination of an engine, a plurality of inlet passages, a throttle for regulating the active charge carrying capacity of said inlet passages, a speed sensitive governor, and connection between said governor and said throttle for holding said throttle partly open at starting and idling and closed at maximum torque.

5. In an internal combustion power plant, the combination of an engine, a plurality of inlet passages, a throttle for reducing the active charge carrying capacity of the inlet passages, a speed sensitive governor, and connections between said governor and said throttle for holding said throttle partly open at starting and idling, closed at maximum torque and open wide at the highest proper running speed.

6. In an internal combustion power plant, the combination of an engine, a plurality of inlet passages, a main throttle for reducing the active charge carrying capacity of said inlet passages, an auxiliary throttle controlling the effectiveness of said throttle, a speed sensitive governor, a connection between said governor and said auxiliary throttle for holding said auxiliary throttle partly open at starting and idling, closed at maximum torque, open wide at the highest proper running speed, and closed at highest speed.

7. In an internal combustion power plant, in combination, an engine, a plurality of inlet passages, a manually controllable throttle, an auxiliary throttle for reducing the active charge carrying capacity of the inlet passages, a speed sensitive governor and connections between said governor and said auxiliary throttle for holding said auxiliary throttle partly open at starting and idling, closed at maximum torque, open wide at highest running speed and closed at highest speed.

8. In combination, an internal combustion engine, a carbureter for supplying fuel mixture therefor, an intermediate mixture carrying member between said carbureter and engine having a smaller passageway and a larger passageway, a main throttle for controlling the outlet from said carbureter, an auxiliary throttle in said larger intermediate passageway, a speed sensitive governor driven by the engine, and a connection between said governor and said auxiliary throttle valve, said connection causing said auxiliary throttle to be slightly open when the engine is idling or running very slowly, said connection being controlled by the governor to close said larger intermediate passageway during the medium speed of engine whereby to restrict the flow of fuel mixture and prevent knocking, said connection causing said auxiliary throttle to reopen as the engine increases in speed through the higher range whereby sufficient fuel mixture will be supplied during such range.

In witness whereof, I hereunto subscribe my name this 19 day of November, 1924.

HARRY L. HORNING.